United States Patent
Filsfils et al.

(10) Patent No.: US 9,369,347 B2
(45) Date of Patent: Jun. 14, 2016

(54) SERVICE TO NODE RESOLUTION

(71) Applicant: Cisco Technology, Inc., San Jose, CA (US)

(72) Inventors: Clarence Filsfils, Brussels (BE); Stefano B. Previdi, Rome (IT); Peter Psenak, Bratislava (SK)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/211,065

(22) Filed: Mar. 14, 2014

(65) Prior Publication Data

US 2014/0269725 A1  Sep. 18, 2014

Related U.S. Application Data

(60) Provisional application No. 61/791,242, filed on Mar. 15, 2013.

(51) Int. Cl.
| | | |
|---|---|---|
| *H04L 12/70* | (2013.01) | |
| *H04L 12/24* | (2006.01) | |
| *H04L 12/721* | (2013.01) | |
| *H04L 12/723* | (2013.01) | |
| *H04L 12/715* | (2013.01) | |
| *H04L 12/741* | (2013.01) | |

(52) U.S. Cl.
CPC ............... *H04L 41/12* (2013.01); *H04L 45/04* (2013.01); *H04L 45/12* (2013.01); *H04L 45/46* (2013.01); *H04L 45/50* (2013.01); *H04L 45/507* (2013.01); *H04L 45/74* (2013.01); *H04L 45/745* (2013.01); *H04L 45/54* (2013.01)

(58) Field of Classification Search
None
See application file for complete search history.

(56) References Cited

U.S. PATENT DOCUMENTS

| | | | |
|---|---|---|---|
| 6,032,197 A | 2/2000 | Birtwell | 709/216 |
| 6,374,303 B1 | 4/2002 | Armitage et al. | 709/242 |
| 6,577,600 B1 | 6/2003 | Bare | 370/238 |
| 6,647,428 B1 | 11/2003 | Bannai et al. | 709/245 |
| 6,963,570 B1 | 11/2005 | Agarwal | 370/310.2 |
| 7,023,846 B1 | 4/2006 | Andersson et al. | 370/389 |
| 7,031,253 B1 | 4/2006 | Katukam et al. | 370/222 |
| 7,031,607 B1 | 4/2006 | Aswood Smith | 398/51 |
| 7,061,921 B1 | 6/2006 | Sheth | 370/395.52 |
| 7,068,654 B1 | 6/2006 | Joseph et al. | 370/392 |
| 7,072,346 B2 | 7/2006 | Hama | 370/395.53 |
| 7,088,721 B1 | 8/2006 | Droz et al. | 370/395.1 |
| 7,154,416 B1 | 12/2006 | Savage | 341/51 |
| 7,174,387 B1 | 2/2007 | Shand et al. | 709/238 |

(Continued)

OTHER PUBLICATIONS

Aggarwal, R. and Y. Rekhter, Juniper Networks; E. Rosen, Cisco Systems, Inc.; "MPLA Upstream Label Assignment and Context Specific Label Space;" Network Working Group; Internet Draft; Jan. 2005; pp. 1-8.

(Continued)

*Primary Examiner* — Omar Ghowrwal
(74) *Attorney, Agent, or Firm* — Campbell Stephenson LLP

(57) ABSTRACT

An apparatus and method for resolving services to nodal segments. The method involves receiving an advertisement. The advertisement includes a service address associated with a service. The method further involves identifying an originator node for the service, where the originator node is associated with a nodal segment identifier. The method further involves updating the advertisement. Updating the advertisement involves adding information identifying the originator node to the advertisement.

20 Claims, 9 Drawing Sheets

(56) References Cited

U.S. PATENT DOCUMENTS

| | | | |
|---|---|---|---|
| 7,180,887 B1 | 2/2007 | Schwaderer | 370/351 |
| 7,260,097 B2 | 8/2007 | Casey | 370/392 |
| 7,286,479 B2 | 10/2007 | Bragg | 370/225 |
| 7,330,440 B1 | 2/2008 | Bryant | 370/254 |
| 7,359,377 B1 | 4/2008 | Kompella et al. | 370/389 |
| 7,420,992 B1 | 9/2008 | Fang | 370/477 |
| 7,430,210 B2 | 9/2008 | Havala et al. | 370/395.53 |
| 7,463,639 B1 | 12/2008 | Rekhter | 370/409 |
| 7,466,661 B1 | 12/2008 | Previdi et al. | 370/254 |
| 7,471,669 B1 | 12/2008 | Sabesan et al. | 370/351 |
| 7,564,803 B1 | 7/2009 | Minei et al. | 370/254 |
| 7,577,143 B1 | 8/2009 | Kompella | 370/392 |
| 7,602,778 B2 | 10/2009 | Guichard et al. | 370/389 |
| 7,610,330 B1 | 10/2009 | Quinn | 709/201 |
| 7,773,630 B2 | 8/2010 | Huang | 370/474 |
| 7,817,667 B2 | 10/2010 | Fredericksen | 370/474 |
| 7,885,259 B2 | 2/2011 | Filsfils | 370/389 |
| 7,885,294 B2 | 2/2011 | Patel | 370/202 |
| 7,894,352 B2 | 2/2011 | Kompella et al. | 370/248 |
| 7,894,458 B2 | 2/2011 | Jiang | 370/401 |
| 7,940,695 B1 | 5/2011 | Bahadur | 370/254 |
| 7,983,174 B1 | 7/2011 | Monaghan | 370/242 |
| 8,064,441 B2 | 11/2011 | Wijnands et al. | 370/389 |
| 8,339,973 B1 | 12/2012 | Pichumani | 370/248 |
| 8,422,514 B1 | 4/2013 | Kothari et al. | 370/466 |
| 8,542,706 B2 | 9/2013 | Wang | 370/474 |
| 8,630,167 B2 | 1/2014 | Ashwood Smith | 370/255 |
| 8,711,883 B2 | 4/2014 | Kang | 370/389 |
| 8,792,384 B2 | 7/2014 | Banerjee et al. | 370/254 |
| 8,953,590 B1 | 2/2015 | Aggarwal | 370/389 |
| 9,036,474 B2 | 5/2015 | Dibirdi | 370/235 |
| 9,112,734 B2 | 8/2015 | Edwards et al. | |
| 9,118,572 B2 | 8/2015 | Sajassi | |
| 2001/0037401 A1 | 11/2001 | Soumlya | 709/232 |
| 2002/0103732 A1 | 8/2002 | Bundy et al. | 705/35 |
| 2003/0016678 A1* | 1/2003 | Maeno | 370/400 |
| 2003/0026271 A1 | 2/2003 | Erb et al. | 370/401 |
| 2003/0126272 A1 | 7/2003 | Corl, Jr. et al. | 709/230 |
| 2003/0142674 A1 | 7/2003 | Casey | 370/393 |
| 2003/0231634 A1 | 12/2003 | Henderson | 370/395.32 |
| 2004/0160958 A1 | 8/2004 | Oh | 370/395.1 |
| 2004/0174879 A1 | 9/2004 | Basso et al. | 370/392 |
| 2004/0196840 A1 | 10/2004 | Amrutur et al. | 370/389 |
| 2005/0213513 A1 | 9/2005 | Ngo | 370/254 |
| 2005/0259655 A1* | 11/2005 | Cuervo et al. | 370/392 |
| 2006/0002304 A1 | 1/2006 | Ashwood-Smith | 370/238 |
| 2006/0013209 A1 | 1/2006 | Somasundaram | 370/389 |
| 2006/0075134 A1 | 4/2006 | Aalto | 709/238 |
| 2006/0080421 A1 | 4/2006 | Hu | 709/223 |
| 2006/0092940 A1 | 5/2006 | Ansari | 370/392 |
| 2006/0262735 A1 | 11/2006 | Guichard | 370/254 |
| 2006/0274716 A1 | 12/2006 | Oswal et al. | 370/349 |
| 2007/0019647 A1 | 1/2007 | Roy et al. | 370/392 |
| 2007/0053342 A1 | 3/2007 | Slereckl | 370/351 |
| 2007/0058638 A1 | 3/2007 | Guichard et al. | 370/395.31 |
| 2007/0189291 A1 | 8/2007 | Tian | 370/390 |
| 2008/0002699 A1 | 1/2008 | Rajsic | 370/392 |
| 2008/0075016 A1 | 3/2008 | Ashwood-Smith | 370/252 |
| 2008/0075117 A1* | 3/2008 | Tanaka | H04L 45/02 370/471 |
| 2008/0084881 A1 | 4/2008 | Dharwadkar et al. | 370/392 |
| 2008/0101227 A1 | 5/2008 | Fujita et al. | 370/232 |
| 2008/0101239 A1 | 5/2008 | Good | 370/235 |
| 2008/0172497 A1 | 7/2008 | Mohan et al. | 709/224 |
| 2008/0189393 A1 | 8/2008 | Wagner | 709/218 |
| 2008/0192762 A1 | 8/2008 | Kompella et al. | 370/395.53 |
| 2008/0225864 A1 | 9/2008 | Aissaoui et al. | 370/401 |
| 2008/0253367 A1 | 10/2008 | Ould-Brahim | 370/389 |
| 2008/0259820 A1 | 10/2008 | White et al. | 370/255 |
| 2009/0041038 A1 | 2/2009 | Martini et al. | 370/401 |
| 2009/0135815 A1 | 5/2009 | Pacella | 370/389 |
| 2010/0063983 A1 | 3/2010 | Groarke et al. | 707/803 |
| 2010/0124231 A1 | 5/2010 | Kompella | 370/40 |
| 2010/0142548 A1 | 6/2010 | Sheth | 370/410 |
| 2010/0220739 A1 | 9/2010 | Ishiguro | 370/401 |
| 2010/0232435 A1 | 9/2010 | Jabr | 370/392 |
| 2010/0284309 A1 | 11/2010 | Allan et al. | 370/256 |
| 2011/0228780 A1 | 9/2011 | Ashwood-Smith | 370/392 |
| 2011/0268114 A1 | 11/2011 | Wijnands et al. | 370/389 |
| 2011/0280123 A1 | 11/2011 | Wijnands et al. | 370/228 |
| 2011/0286452 A1 | 11/2011 | Balus | 370/390 |
| 2012/0044944 A1 | 2/2012 | Kotha et al. | 370/401 |
| 2012/0069740 A1 | 3/2012 | Lu et al. | 370/238 |
| 2012/0069845 A1 | 3/2012 | Carnet et al. | 370/392 |
| 2012/0082034 A1 | 4/2012 | Vasseur | 370/235 |
| 2012/0120808 A1 | 5/2012 | Nandagopal et al. | 370/238 |
| 2012/0213225 A1 | 8/2012 | Subramanian et al. | 370/392 |
| 2012/0218884 A1 | 8/2012 | Kini | 370/228 |
| 2012/0307629 A1 | 12/2012 | Vasseur | 370/228 |
| 2013/0003728 A1 | 1/2013 | Kwong et al. | 370/389 |
| 2013/0077476 A1 | 3/2013 | Enyedi | 370/225 |
| 2013/0077626 A1* | 3/2013 | Keesara et al. | 370/390 |
| 2013/0142052 A1 | 6/2013 | Burbidge | 370/242 |
| 2013/0188634 A1 | 7/2013 | Magee | 370/389 |
| 2013/0219034 A1 | 8/2013 | Wang | 709/222 |
| 2013/0258842 A1 | 10/2013 | Mizutani | 370/228 |
| 2013/0266012 A1 | 10/2013 | Dutta et al. | 370/392 |
| 2013/0266013 A1 | 10/2013 | Dutta et al. | 370/392 |
| 2013/0343204 A1 | 12/2013 | Geib et al. | 370/248 |
| 2014/0098675 A1 | 4/2014 | Frost et al. | 370/241.1 |
| 2014/0169370 A1 | 6/2014 | Filsfils et al. | 370/392 |
| 2014/0177638 A1 | 6/2014 | Bragg et al. | 370/395.3 |
| 2014/0254596 A1 | 9/2014 | Filsfils et al. | 370/392 |
| 2014/0269266 A1 | 9/2014 | Filsfils et al. | 370/228 |
| 2014/0269421 A1 | 9/2014 | Previdi et al. | 370/254 |
| 2014/0269422 A1 | 9/2014 | Filsfils et al. | 370/254 |
| 2014/0269698 A1 | 9/2014 | Filsfils et al. | 370/389 |
| 2014/0269699 A1 | 9/2014 | Filsfils et al. | 370/389 |
| 2014/0269721 A1 | 9/2014 | Bashandy | 370/392 |
| 2014/0269727 A1 | 9/2014 | Filsfils et al. | 370/392 |
| 2014/0286195 A1 | 9/2014 | Fedyk | 370/254 |
| 2014/0317259 A1 | 10/2014 | Previdi et al. | 709/223 |
| 2014/0341222 A1 | 11/2014 | Filsfils et al. | 370/395.5 |
| 2014/0369356 A1 | 12/2014 | Bryant et al. | 370/392 |

OTHER PUBLICATIONS

Awduche, Daniel O., et al., "RSVP-TE: Extensions to RSVP for LSP Tunnels," Network Working Group, Internet-Draft, Feb. 2001, pp. 1-12.

Awduche, Daniel O., et al., "RSVP-TE: Extensions to RSVP for LSP Tunnels," Network Working Group, Request for Comments 3209, Dec. 2001, pp. 1-61.

Backes, P. and Rudiger Geib, "Deutsche Telekom AG's Statement About IPR Related to Draft-Geig-Spring-OAM-Usecase-01," Aug. 23, 2012, pp. 1-2.

Bryant, S. et al., Cisco Systems, "IP Fast Reroute Using Tunnels-draft-bryant-ipfrr-tunnels-03", Network Working Group, Internet-Draft, Nov. 16, 2007, pp. 1-30.

Bryant, S., et al., Cisco Systems, "Remote LFA FRR," draft-ietf-rtgwg-remote-lfa-04, Network Working Group, Internet-Draft, Nov. 22, 2013, pp. 1-24.

Crabbe, E., et al., "PCEP Extensions for MPLS-TE LSP Protection With Stateful PCE Draft-Crabbe-PCE-Stateful-PCT-Protection-00," Network Working Group, Internet-Draft, Apr. 2013, pp. 1-12.

Crabbe, E., et al., Stateful PCE Extensions for MPLS-TE LSPs, draft-crabbe-pce-statement-pce-mpls-te-00; Network Working Group, Internet-Draft, Apr. 15, 2013, pp. 1-15.

Deering, S., et al., Cisco, Internet Protocol, Version 6 (IPv6) Specification, Network Working Group, Request for Comments 2460, Dec. 1998, pp. 1-39.

Farrel, A., et al., Old Dog Consulting, A Path Computation Element (PCE)—Based Architecture, Network Working Group, Request for Comments 4655, Aug. 2006, pp. 1-80.

Farrel, A., et al., Old Dog Consulting, Inter-Domain MPLS and GMPLS Traffic Enginerring—Resource Reservation Protocol-Traffic Enginerring (RSVP-TE) Extensions, Newtork Working Group, Request for Comments 5151, Feb. 2008.

(56) References Cited

OTHER PUBLICATIONS

Fedyk, D., et al., Alcatel-Lucent, Generalized Multiprotocol Label Switching (GMPLS) Control Ethernet Provider Backbone Traffic Engineering (PBB-TE), Internet Engineering Task Force (IETF), Request for Comments 6060, Mar. 2011, pp. 1-20.
Filsfils, C., et al., Cisco Systems, Inc., "Segment Routing Architecture," draft-filsfils-rtgwg-segment-routing-00, pp. 1-28.
Filsfils, C., et al., Cisco Sytems, Inc., "Segment Routing Architecture," draft-filsfils-rtgwg-segment-routing-01, Network Working Group, Internet-Draft, Oct. 21, 2013, pp. 1-28.
Frost, D., et al., Cisco Systems, Inc., "MPLS Generic Associated Channel (G-Ach) Advertisement Protocol," draft-ietf-mpls-gach-adv-00, Internet-Draft, Jan. 27, 2012, pp. 1-17.
Frost, D., et al., Cisco Systems, Inc., "MPLS Generic Associated Channel (G-Ach) Advertisement Protocol," draft-ietf-mpls-gach-adv-08, Internet-Draft, Jun. 7, 2013, pp. 1-17.
Frost, D., et al., Cisco Systems, Inc., "MPLS Generic Associated Channel (G-Ach) Advertisement Protocol," Request for Comments 7212, Jun. 2014, pp. 1-23.
Geib, R., "Segment Routing Based OAM Use Case,"IETF 87, Gerlin, Jul./Aug. 2013, pp. 1-3.
Geib, R., Deutsch Telekom, "Use Case for a Scalable and Topology Aware MPLS data plan moniotoring System," draft-geib-spring-oam-usecase-00; Internet-Draft, Oct. 17, 2013, pp. 1-11.
Geib, R., Deutsch Telekom, "Use Case for a Scalable and Topology Aware MPLS data plan moniotoring System," draft-geib-spring-oam-usecase-01; Internet-Draft, Feb. 5, 2014, pp. 1-10.
Gredler, H., et al., Juniper Networks, Inc., "Advertising MPLS Labels in IS-IS draft-gredler-isis-label-advertisement-00," Internet-Draft; Apr. 5, 2013; pp. 1-13.
Gredler, H. et al., hannes@juniper.net, IETF87, Berlin, "Advertising MPLS LSPs in the IGP," draft-gredler-ospf-label-advertisement, May 21, 2013; pp. 1-14.
Guilbaud, Nicolas and Ross Cartlidge, "Google—Localizing Packet Loss in a Large Compex Network," Feb. 5, 2013, pp. 1-43.
Imaizumi, H., et al.; Networks, 2005; "FMEHR: an Alternative Approach to Multi-Path Forwarding on Packed Switched Networks," pp. 198-201.
Kompella, K. et al, Juniper Networks, "Label Switched Paths (LSP) Hierarchy with Generalized Multi-Protocol Label Switching (GMPLS) Traffic Enginerring (TE)," Network Working Group, Request for Comments 4206, Oct. 2005, pp. 1-14.
Kompella, K., et al., Juniper Networks, Inc., "Detecting Multi-Protocol Label Switched (MPLS) Data Plane Failures," Network Working Group, Request for Comments 4379, Feb. 2006, pp. 1-50.
Kompella, K. et al., Juniper Networks,"Virtual Private LAN Service (VPLS) Using BGP for Auto-Discovery and Signaling," Network Working Group, Request for Comments 4761, Jan. 2007, pp. 1-28.
Kumar, N. et al., Cisco Systems, Inc., "Label Switched Path (LSP) Ping/Trace for Segment Routing Networks Using MPLS Dataplane," draft-kumar-mpls-spring-lsp-ping-00, Oct. 21, 2013, pp. 1-12.
Kumar, N. et al, "Label Switched Path (LSP) Ping/Trace for Segment Routing Networks Using MPLS Dataplane," draft-kumarkini-mpls-spring-lsp-ping-00, Network Work Group, Internet-Draft, Jan. 2, 2014, pp. 1-15.
Previdi, S. et al., Cisco Systems, Inc., "Segment Routing with IS-IS Routing Protocol, draft-previdi-filsfils-isis-segment-routing-00," IS-IS for IP Internets, Internet-Draft, Mar. 12, 2013, pp. 1-27.
Previdi, S. et al., Cisco Systems, Inc., "Segment Routing with IS-IS Routing Protocol, draft-previdi-filsfils-isis-segment-routing-02," Internet-Draft, Mar. 20, 2013, A55 pp. 1-27.
Raszuk, R., NTT I3, "MPLS Domain Wide Labels," draft-raszuk-mpls-domain-wide-labels-00, MPLS Working Group, Internet-Draft, Jul. 14, 2013, pp. 1-6.
Rosen, E. et al., Cisco Systems, Inc., "BGP/MPLS VPNs", Network Working Group, Request for Comments: 2547; Mar. 1999, pp. 1-26.
Sivabalan, S., et al.; "PCE-Initiated Traffic Engineering Path Setup in Segment Routed Networks; draft-sivabalan-pce-segmentrouting-00. txt," Internet Engineering Task Force, IETF; Standard Working Draft, Internet Society (ISOC) 4, Rue Des Falaises CH-1205, Geneva, Switzerland, Jun. 2013, pp. 1-16.
Tian, Albert J. et al., Redback Networks, "Source Routed MPLS LSP Using Domain Wide Label, draft-tian-mpls-lsp-source-route-01.txt", Network Working Group, Internet Draft, Jul. 2004, pp. 1-12.
Vasseur, JP, et al.; Cisco Systems, Path Computation Element (PCE) Communication Protocol (PCEP): Request for Comments: 5440, Internet Engineering Task Force, IETF; Standard, Internet Society (ISOC) 4, Rue Des Falaises CH-1205, Geneva, Switzerland, chapters 4-8, Mar. 2009; pp. 1-87.
Wijnands, Ijsbrand and Bob Thomas, Cisco Systems, Inc,; Yuji Kamite and Hitoshi Fukuda, NTT Communications; "Multicast Extensions for LDP;" Network Working Group; Internet Draft; Mar. 2005; pp. 1-12.
Francois, Pierre Jean Rene; "Loop Avoidance During Network Convergence in Switched Networks"; U.S. Appl. No. 14/319,353, filed Jun. 30, 2014; consisting of Specification, Claims and Abstract (29 pages); and Drawings (6 sheets).
Previdi, Stefano B.; "Segment Routing Using a Remote Forwarding Adjacency Identifier"; U.S. Appl. No. 14/334,300, filed Jul. 17, 2014; consisting of Specification, Claims and Abstract (23 pages); and Drawings (8 sheets).
Previdi, Stefano B; "Segment Routing Extension Headers"; U.S. Appl. No. 14/212,084, filed Mar. 14, 2014; consisting of Specification, Claims and Abstract (43 pages); and Drawings (17 sheets).
Filsfils, C. et al., Cisco Systems, Inc., "Segment Routing Interoperability with LDP", draft-filsfils-spring-segment-routing-ldp-interop-01.txt; Apr. 18, 2014, pp. 1-16.
Cisco Systems, Inc., "Introduction to Intermediate System-to-Intermediate System Protocol," published 1992-2002; pp. 1-25.
Eckert, Toerless et al., "Traffic Engineering for Bit Indexed Explicit Replication", U.S. Appl. No. 14/814,575, filed Jul. 31, 2015; consisting of Specification, Claims, and Abstract (75 pages); Drawings (18 sheets).
Eckert, Toerless et al., "Traffic Engineering for Bit Indexed Explicit Replication", U.S. Appl. No. 14/862,915, filed Sep. 23, 2015; consisting of Specification, Claims, and Abstract (75 pages); and Drawings (18 sheets).
Eckert, T., "Traffic Engineering for Bit Index Explicit Replication BIER-TE, draft-eckert-bier-te-arch-00," Network Working Group, Internet-Draft, Mar. 5, 2015, pp. 1-21.
Eckert, T., et al., "Traffic Engineering for Bit Index Explicit Replication BIER-TE, draft-eckert-bier-te-arch-01," Network Working Group. Internet-Draft, Jul. 5, 2015, pp. 1-23.
Li, T., et al., Redback Networks, Inc., "IS-IS Extensions for Traffic Engineering," Network Working Group, Request for Comments 5305, Oct. 2008, 17 pages.
Vasseur, JP, et al.; Cisco Systems, Inc. "A Link-Type Sub-TLV to Convey the Number of Traffic Engineering Label Switched Paths Signaled with Zero Reserved Bandwidth Across a Link," Network Working Group, Request for Comments 5330; Oct. 2008, 16 pages.
Eckert, Toerless el al., "Failure Protection for Traffic-Engineered Bit Indexed Explicit Replication", U.S. Appl. No. 15/054,480, filed Feb. 26, 2016; consisting of Specification, Claims, Abstract, and Drawings (76 pages).

* cited by examiner

SERVICE TO NODE RESOLUTION

RELATED APPLICATIONS

This application claims the domestic benefit under Title 35 of the United States Code §119(e) of U.S. Provisional Patent Application Ser. No. 61/791,242, entitled "Segment Routing," filed Mar. 15, 2013, which is hereby incorporated by reference in its entirety and for all purposes as if completely and fully set forth herein.

BACKGROUND

Network nodes are capable of receiving and forwarding packets. Network nodes may take form in one or more routers, one or more bridges, one or more switches, one or more servers, or any other suitable communications processing device. A packet is a formatted unit of data that typically contains control information and payload data. Control information may include, for example: source and destination IP addresses, error detection codes like checksums, sequencing information, and the like. Control information is typically found in packet headers and trailers, and payload data is typically found in between the headers and trailers.

Packet forwarding involves decision processes that, while simple in concept, can be complex. Since packet forwarding decisions are handled by nodes, the total time required to perform packet forwarding decision processes can become a major limiting factor in overall network performance.

Making packet forwarding decisions utilizes forwarding information that is distributed among nodes. Various mechanisms for distributing the forwarding information exist. Distributing forwarding information can be a complex endeavor involving numerous decisions regarding, for example, what forwarding information should be sent, which nodes should do the sending, to which nodes the forwarding information should be sent, and which protocols should be used for sending the forwarding information. Within an autonomous system, interior gateway protocols are used to distribute forwarding information.

DETAILED DESCRIPTION

Overview

Figure 1:
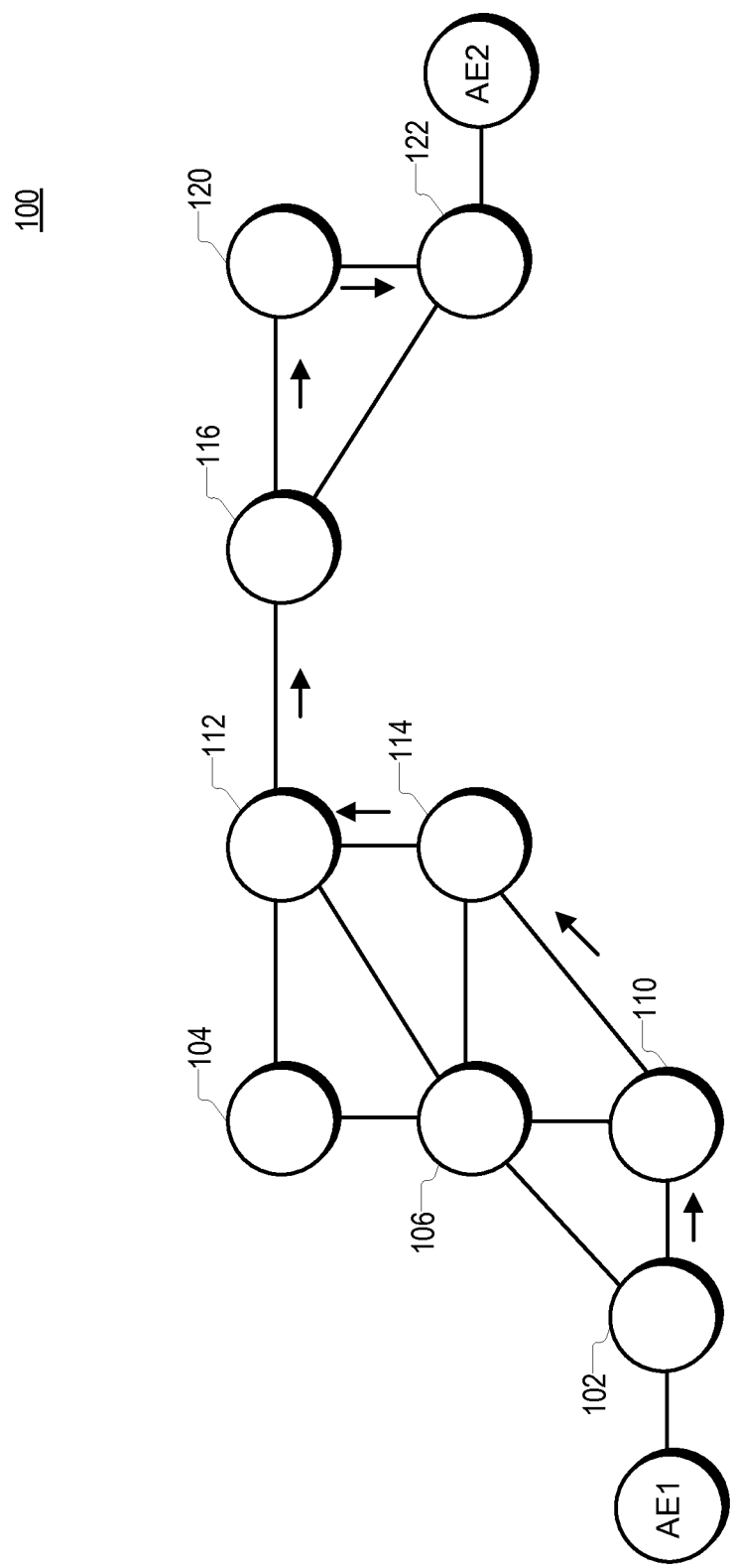
FIG. 1 is a block diagram illustrating an example provider network.

An apparatus and method for resolving services to nodal segments. The method involves receiving an advertisement. The advertisement includes a service address associated with a service. The method further involves identifying an originator node for the service, where the originator node is associated with a nodal segment identifier. The method further involves updating the advertisement. Updating the advertisement involves adding information identifying the originator node to the advertisement.

Packet Forwarding Mechanisms

IP routing and MPLS are distinct packet forwarding mechanisms. IP routing uses IP addresses inside packet headers to make packet forwarding decisions. In contrast, MPLS implements packet forwarding decisions based on short path identifiers called labels attached to packets. Segment routing (SR) is yet another packet forwarding mechanism. SR is similar to MPLS in many regards. For example, packet forwarding decisions in SR can be based on short path identifiers called segment IDs attached to packets. However, substantial differences exist between SR and MPLS as will be more fully described below.

IP Routing

IP routing uses IP forwarding tables, which are created at nodes using routing information distributed between nodes via one or more protocols like an internal gateway protocol (IGP) and/or a border gateway protocol (BGP). In simple terms, IP forwarding tables map destination addresses to the next hops that packets take to reach their destinations. When a node receives a packet, the node can access a forwarding table using the destination address in the packet and lookup a corresponding egress interface for the next hop. The node then forwards the packet through the egress interface. The next hop that receives the packet performs its own forwarding table lookup using the same destination IP address, and so on.

MPLS and LDP

MPLS is commonly employed in provider networks. Packets enter an MPLS network via an ingress edge node, travel hop-by-hop along a label-switched path (LSP) that typically includes one or more core nodes, and exit the MPLS network via an egress edge node.

Packets are forwarded along an LSP based on labels and LDP forwarding tables. Labels allow for the use of very fast and simple forwarding engines in the data plane of nodes. Another benefit of MPLS is the elimination of dependence on a particular Open Systems Interconnection (OSI) model data link layer technology to forward packets.

A label is a short, fixed-length, locally significant identifier that can be associated with a forwarding equivalence class (FEC). Packets associated with the same FEC should follow the same LSP through the network. LSPs can be established for a variety of purposes, such as to guarantee a certain level of performance when transmitting packets, to forward packets around network congestion, to create tunnels for network-based virtual private networks, etc. In some ways, LSPs are similar to circuit-switched paths in ATM or Frame Relay networks, except that they are not dependent on a particular Layer 2 technology.

LDP is employed in the control planes of nodes. Two nodes, called LDP peers, can bi-directionally exchange labels on a FEC by FEC basis. LDP can be used in a process of building and maintaining LDP forwarding tables that map labels and next hop egress interfaces. These forwarding tables can be used to forward packets through MPLS networks as more fully described below.

When a packet is received by an ingress edge node of an MPLS network, the ingress node may determine a corresponding FEC. Characteristics for determining the FEC for a packet can vary, but typically the determination is based on the packet's destination IP address. Quality of Service for the packet or other information may also be used to determine the FEC. Once determined, the ingress edge node can access a table to select a label that is mapped to the FEC. The table may also map a next hop egress interface to the FEC. Before the ingress edge node forwards the packet to the next hop, the ingress node attaches the label.

When a node receives a packet with an attached label (i.e., the incoming label), the node accesses an LDP forwarding table to read a next hop egress interface and another label (i.e., an outgoing label), both which are mapped to the incoming label. Before the packet is forwarded via the egress interface, the node swaps the incoming label with the outgoing label. The next hop receives the packet and may perform the same process. This process is often called hop-by-hop forwarding along a non-explicit path. The penultimate node in the LSP may pop, or remove, the incoming label before forwarding the packet to an egress edge node in the network, which in turn may forward the packet towards its destination using the packet's destination address and an IP forwarding table.

To illustrate MPLS aspects, FIG. 1 shows a portion of an example MPLS network 100 that includes nodes 102-122 coupled together via communication links. An LSP from node 102 to node 122 can be created so that all packets of a stream associated with a particular FEC sent from node 102 to node 122 will travel through the same set of nodes. Each node maintains information for the LSP established through it in an LDP forwarding table. Thus, if node 110 knows that node 114 is the next hop along the LSP for all packets received from node 102 that are destined for node 122, node 110 can forward the packets to node 114.

Segment Routing

Segment routing (SR) is a mechanism in which nodes forward packets using SR forwarding tables and segment IDs Like MPLS, SR enables very fast and simple forwarding engines in the data plane of nodes. SR is not dependent on a particular Open Systems Interconnection (OSI) model data link layer technology to forward packets.

SR nodes (i.e., nodes employing SR) make packet forwarding decisions based on segment IDs as opposed to labels, and as a result SR nodes need not employ LDP in their control planes. Unless otherwise indicated, the SR nodes described below lack LDP in the control plane.

Packets can enter an SR enabled network (i.e., a network of nodes that are SR enabled) via an ingress edge node, travel hop-by-hop along a segment path (SP) that includes one or more core nodes, and exit the network via an egress edge node.

Like labels, segment IDs are short (relative to the length of an IP address or a FEC), fixed-length identifiers. Segment IDs may correspond to topological segments of a network, services provided by network nodes, etc. Topological segments represent one-hop or multi-hop paths to SR nodes. Topological segments act as sub-paths that can be combined to form an SP. Stacks of segment IDs can represent SPs, and SPs can be associated with FECs as will be more fully described below.

There are several types of segment IDs including nodal segment IDs, adjacency segment IDs, etc. Nodal segment IDs are assigned to nodes so that no two SR nodes belonging to a network domain are assigned the same nodal segment ID. Nodal segment IDs can be mapped to unique SR node identifiers such as node loopback IP addresses (hereinafter node loopbacks). In one embodiment, all assigned nodal segment IDs are selected from a predefined ID range (e.g., [32, 5000]). A nodal segment ID corresponds to a one-hop or a multi-hop, shortest path (SPT) to an SR node assigned the nodal segment ID as will be more fully described below.

An adjacency segment ID represents a direct link between adjacent SR nodes in a network. Links can be uniquely identified. For purposes of explanation only, this disclosure will identify a link using the loopbacks of nodes between which the link is positioned. To illustrate, for a link between two nodes identified by node loopback X and node loopback Y, the link will be identified herein as link XY. Because loopbacks are unique, link IDs are unique. Link IDs should not be confused with adjacency segment IDs; adjacency segment IDs may not be unique within a network. This disclosure will presume that only one link exists between nodes in a network, it being understood the present disclosure should not be limited thereto.

Each SR node can assign a distinct adjacency segment ID for each of the node's links. Adjacency segment IDs are locally significant; separate SR nodes may assign the same adjacency segment ID, but that adjacency segment ID represents distinct links. In one embodiment, adjacency segment IDs are selected from a predefined range that is outside the predefined range for nodal segment IDs.

SR nodes can advertise routing information including nodal segment IDs bound to loopbacks, adjacency segment IDs mapped to link IDs, etc., using protocols such as IGP and/or BGP with SR extension. Nodes can use the routing information they receive to create or update SR forwarding tables. To illustrate, SR nodes may use the routing information they receive in order to create topology maps of the network, which in turn can be used to identify next hop egress interfaces of shortest paths (SPTs) to respective node loopbacks. The identified SPT or next hop egress interfaces are then mapped to respective nodal segment IDs in an SR forwarding table. Nodes can also map their adjacency segment IDs to egress interfaces for respective links in SR forwarding tables. Because adjacency segment IDs are locally significant, however, adjacency segment IDs should only be mapped in SR forwarding tables of the nodes that advertise the adjacency segment IDs. In other words, an SR node that advertises an adjacency segment ID should be the only node in the network area that has an SR forwarding table that maps the adjacency segment ID to an egress interface.

As noted above, SR enables segment paths (SPs), which can be used for transporting packets through a network. SPs can be associated with FECs, and can be established for a variety of purposes. Packets associated with the same FEC normally traverse the same SP towards their destination. Nodes in SPs make forwarding decisions based on segment IDs, not based on the contents (e.g., destination IP addresses) of packets. As such, packet forwarding in SPs is not dependent on a particular Layer 2 technology.

Edge nodes and/or other devices (e.g., a centralized control plane server) of an SR network use routing information (nodal segment IDs bound to loopbacks, adjacency segment IDs mapped to link IDs, etc.) they receive in link advertisements to create ordered lists of segment IDs (i.e., segment ID stacks). Segment ID stacks correspond to respective SPs. Individual segment IDs in a stack may correspond to respective segments or sub paths of a corresponding SP.

When an SR ingress edge node receives a packet, the node or a centralized control plane server in data communication with the node, can select an SP for the packet based on information contained in the packet. In one embodiment, a FEC may be calculated for the packet using the packet's destination address. The FEC is then used to select a segment ID stack mapped thereto. The ingress edge node can attach the selected segment ID stack to the packet via an SR header. The packet with attached stack is forwarded along and can traverse the segments of the SP in an order that corresponds to the list order of the segment IDs in the stack. A forwarding engine operating in the data plane of each SR node can use the top segment ID within the stack to lookup the egress for next hop. As the packet and attached segment ID stack are forwarded along the SP in a hop-by-hop fashion, segment IDs can be popped off the top of the stack. In another embodiment, the attached stack of segment IDs remains unchanged as the packet is forwarded along the SP. In this embodiment, a pointer to an active segment ID in the stack can be advanced as the packet is forwarded along the SP. In contrast to MPLS, however, segment IDs are typically not swapped as the packet and attached segment ID stack are forwarded along the SP.

Figure 2:
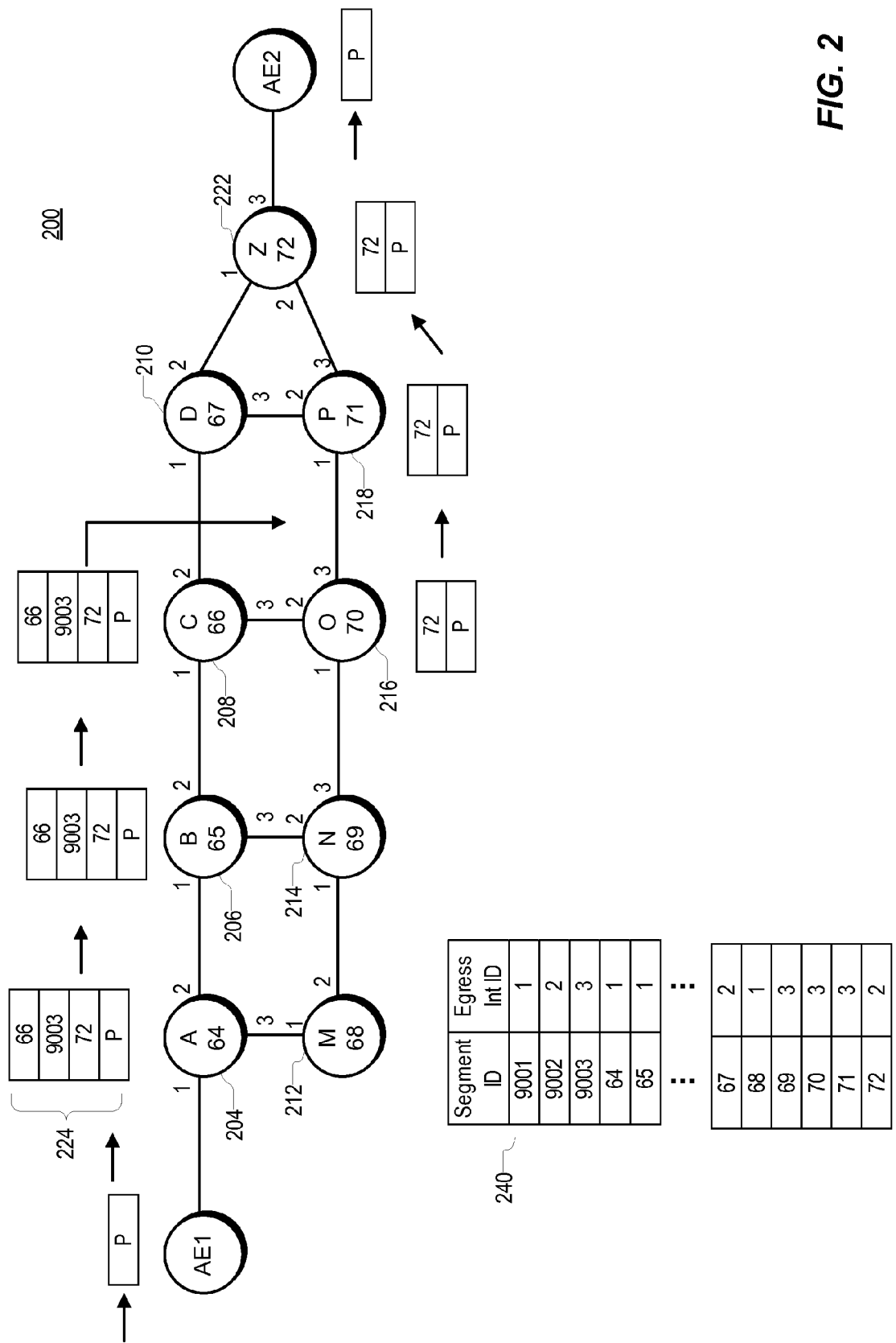
FIG. 2 is a block diagram illustrating an example provider network.

To illustrate general concepts of SR, FIG. 2 shows an example SR enabled provider network that is in data communication with access network nodes AE1 and AE2. Network 202 consists of SR nodes 204-222. Nodes 204-210 are assigned unique nodal segment IDs 64-67, respectively, nodes 212-218 are assigned unique nodal segment IDs 68-71, respectively, and node 222 is assigned unique nodal segment ID of 72. Each of the SR nodes 204-222 have interfaces that are identified as shown. For example, node 204 has three interfaces designated 1-3, respectively. Each of the nodes 204-222 is assigned a unique loopback. Loopbacks A-D are assigned to nodes 204-210, respectively, loopbacks M-P are assigned to nodes 212-218 respectively, and loopback Z is assigned to node 222. These loopbacks are unique in the network and can be used for several purposes such as calculating the topology of network 202, which in turn can be used to create SPs and/or to identify SPTs that are next hop egress interfaces for SR forwarding tables. Nodes 204-222 can also assign locally significant adjacency segment IDs. For example, node 208 can assign adjacency segment IDs 9001-9003 to links CB, CD, and CO, respectively.

Each of SR nodes 204-222 can advertise routing information to the other nodes in network 202 using IGP with SR extension. For example, node 208 can generate and send one or more link state advertisements that include adjacency segment IDs 9001-9003 bound to link IDs CB, CD, and CO, respectively, and nodal segment ID 66 bound to loopback C. One of ordinary skill understands that link state advertisements may contain additional information. Using the advertisements they receive, the control planes of nodes 204-222 can generate respective SR forwarding tables for use in the data planes. For example, node 208 can generate example SR forwarding table 240 that maps adjacency segment IDs 9001-9003 to node interface IDs 1-3, respectively, and nodal segment IDs such as 64, 65, 67, 70, and 72, to node 208 interfaces 1, 1, 2, 3, and 2, respectively, which are the SPT next hop egress interfaces determined by node 208 for loopbacks A, B, D, O, and Z respectively. It is noted that in the embodiment shown, only SR forwarding table 240 maps adjacency segment IDs 9001-9003 to interfaces; SR forwarding tables in the other nodes of network 202 should not map adjacency segment IDs 9001-9003.

In addition to creating SR forwarding tables based on received segment ID advertisements, SR nodes or a centralized control plane server (not shown) can create segment ID stacks for respective SPs. For example, ingress edge node 204 creates example segment ID stack 224 for an SP between ingress edge node 204 and egress edge node 222. Example segment stack 224 can be created for a particular FEC (e.g., FEC F). Example stack 224 includes three segment IDs: nodal segment IDs 66 and 72 advertised by nodes 208 and 222, respectively, and adjacency segment ID 9003 advertised by node 208. Stack 224 corresponds to an SP in which packets flow in order through nodes 204, 206, 208, 216, 218, and 222.

In response to receiving a packet from access node AE1, SR node 204 or a centralized control plane server (not shown) can select a segment ID stack based on information contained in the packet. For example, node 204 can calculate FEC F for a received packet P based on the destination IP address in packet P. FEC F is mapped to example stack 224 in a table not shown. Node 204 attaches stack 224 to packet P. Example segment stack 224 lists segment IDs that correspond to one-hop and multi-hop segments that packets traverse to reach egress edge node 222. The segments collectively form the SP corresponding to stack 224. Once the segment stack 224 is attached to packet P, ingress SR enable node 204 may access a SR forwarding table (not shown) using the top segment ID (e.g., segment ID=66) to read egress interface identifier 2, which is the next hop egress interface for the SPT to the SR node assigned nodal segment ID 66.

Figure 3:
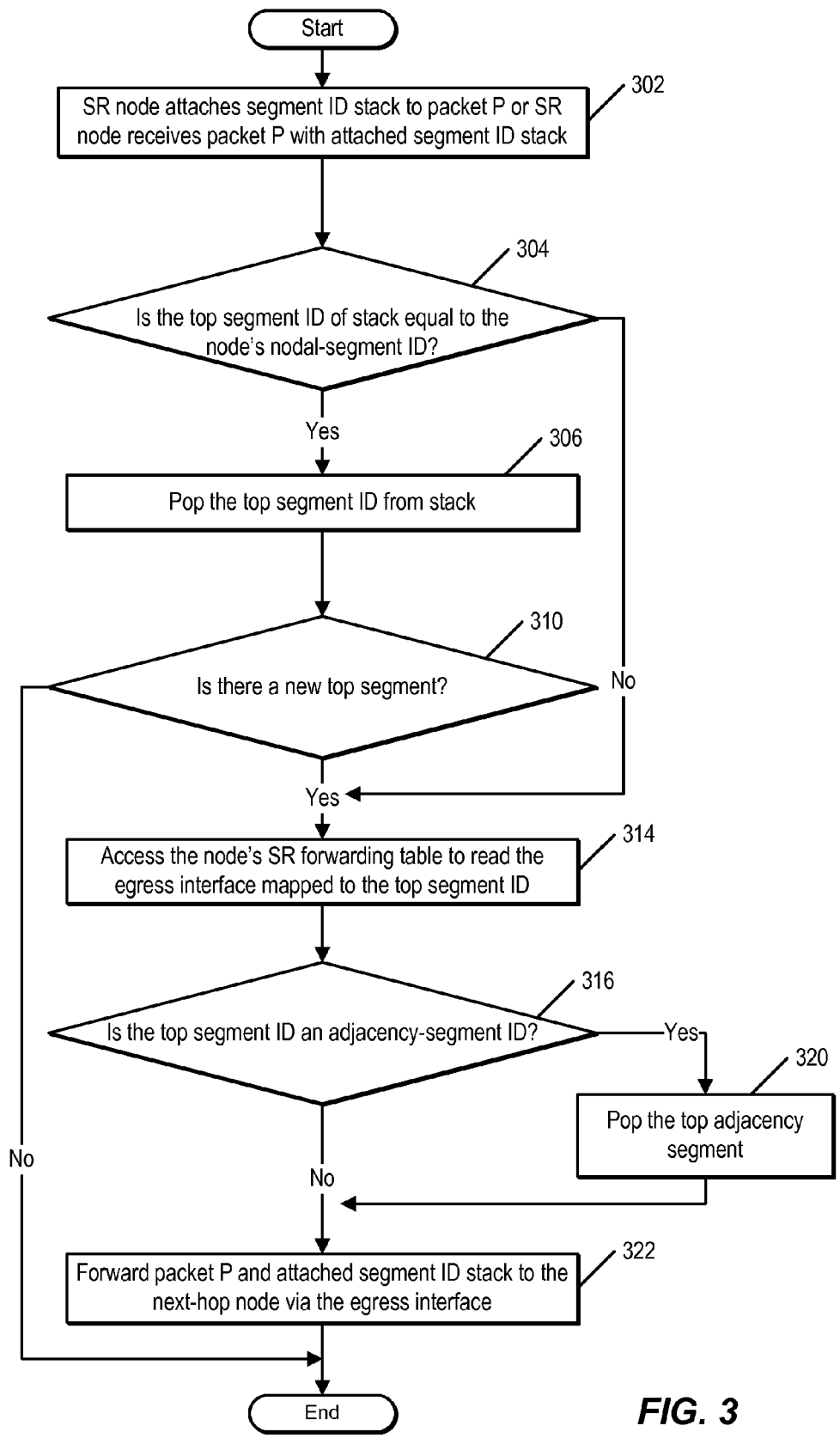
FIG. 3 is a flow chart illustrating an example process employed by a node of the network shown in FIG. 2.

With continuing reference to FIG. 2, FIG. 3 illustrates example process of packet forwarding using segment IDs according to one embodiment. More particularly, FIG. 3 illustrates an example method performed by an SR node, including an edge node, in a network like that shown in FIG. 2. In response to receiving a packet with an attached segment ID stack, or in response to attaching a segment ID stack to a packet at 302, the SR node determines in step 304 whether the top segment ID of the stack matches the nodal segment ID assigned to the SR node. If there is a match, the process proceeds to step 306 where the SR node pops the top segment ID, which may expose an underlying segment ID as the new top segment ID. If there is no new top segment ID (i.e., the segment popped in 306 was the last segment ID of the stack) the packet P has arrived at the egress edge node, and the process ends. If a new top segment ID is exposed, or if there is no match of segment IDs in step 304, the SR node accesses its SR forwarding table in step 314 to read the egress interface that is mapped to the top segment ID. In step 316 the SR node determines whether the top segment ID is an adjacency segment ID. This determination can be implemented by simply comparing the top segment ID with the designated range of adjacency segment IDs that are available for assignment within the network. If the top segment ID is found to be within the designated range, the top segment ID is an adjacency segment ID and it is popped. In step 322 the SR node forwards packet P and attached stack to the next node via the egress interface identified in step 314.

With continuing reference to FIG. 3, FIG. 2 shows packet P and attached stack 224 as it is forwarded by nodes. As shown, nodes 204 and 206 forward packet P and stack 224 without popping a segment ID. However, node 208 pops nodal segment ID 66 and adjacency segment ID 9003 in accordance with steps 306 and 320, respectively, before the packet P and stack 224 are forwarded to node 216 in accordance with step 322. Nodes 216 and 218 forward packet P and stack 224 without popping segment IDs. SR egress edge node 222 recognizes itself as the last hop of the SP. Eventually, node 222 may employ traditional IP routing and forward packet P to access node AE2 based on routing table lookup using the destination IP address within packet P.

Interior Gateway Protocols

Interior gateway protocols (IGPs) are used to distribute routing information within an autonomous system (AS) or network domain. One IGP is known as intermediate system to intermediate system (ISIS). Another IGP is open shortest path first (OSPF). Both ISIS and OSPF are link-state protocols. Nodes implementing link-state protocols exchange information regarding connectivity of resources (e.g., nodes, services) and use the info to construct maps of the network topology. ISIS uses type-length value (TLV) fields to support options and features, while OSPF does not.

Service to Node Resolution

Nodes can provide services, such as packet filtering, deep packet inspection, tunneling, and the like. Each service provided by a node can be represented by its own unique service address, such as an IP address. Service addresses can be advertised using IGP and nodes can maintain and update forwarding tables that show which services are associated with which nodes. This enables a node, in response to receiving a packet having a service address as the destination address, to identify one or more nodes that are configured to provide the service and to forward the packet to one (or more) of the identified nodes.

Networks are sometimes known as routing domains, autonomous systems, and the like. Large networks are sometimes divided into areas. Forwarding tables are maintained by the nodes of an area for the nodes in the area. The nodes in an area can reach the other nodes in the area without traversing an area boundary. For nodes that are outside the area, less information is maintained. Nodes within an area may have no information about what nodes are in other areas and the services provided in the other areas. Packets are relayed from one area to another by special nodes that are configured to perform this task. In ISIS, such nodes are known as level 2 capable nodes. In OSPF, the nodes are known as area border routers (ABRs).

ISIS employs a two-level hierarchy. A designation of level 1 is applied to areas. Nodes that communicate within a level 1 area are known as level 1 capable nodes, or level 1 nodes. Level 1 nodes know the topology only of the areas in which the level 1 nodes are located. Level 1 nodes maintain level 1 forwarding information (e.g., link-state databases) with information for intra-area routing. Nodes that can communicate between multiple level 1 areas are known as level 2 capable nodes, or level 2 nodes. Level 1 nodes can locate a level 2 node, e.g., the closest level 2 node, and convey packets to the level 2 node for transmission to other areas. Level 2 nodes maintain level 2 forwarding information (e.g., link-state databases) with information for inter-area routing. In OSPF, a specific area (area 0) is designated for inter-area communication. A node in a given area can locate an ABR that is located both in the node's area and in area 0 and forward the ABR packets destined for other areas. The ABR forwards the packets to the appropriate area(s). For the purposes of brevity, when referring to level 2 nodes, or other concepts specific to ISIS it is understood that such references are likewise applicable to ABRs, or other corresponding OSPF concepts.

Nodes advertise addresses using by sending advertisements, which may be packets, such as link-state packets or link state advertisements. Level 2 nodes propagate the advertisements to other areas. For example, nodal segment IDs are distributed to all nodes in a network. If a node in one area wishes to forward a packet along a particular nodal segment, the node can do so regardless of whether the node identified by the nodal segment ID is within the same area as the node or in a different area. Nodal segment IDs are global within a given network domain or autonomous system. Level 2 nodes forward nodal segment ID advertisements between areas. For example, a node in one area can transmit a LSP that includes the node's IP address and a nodal segment assigned to the node (associated with the given IP address). Other nodes in the area receive the LSP. A level 2 node receives the LSP and propagates the LSP to other areas.

When a node in a given area sends an LSP advertising a service address, other nodes in the given area are able to resolve the node to which the service is attached, identify a nodal segment ID associated with the node, and forward packets to the service along the nodal segment. However, since no nodal segment is advertised with the service, nodes in areas other than the one in which the service is available may be unable to determine which nodal segment should be used to reach the node via which the service is available, e.g., the node that generated and forwarded the LSP advertising the service.

Figure 4:
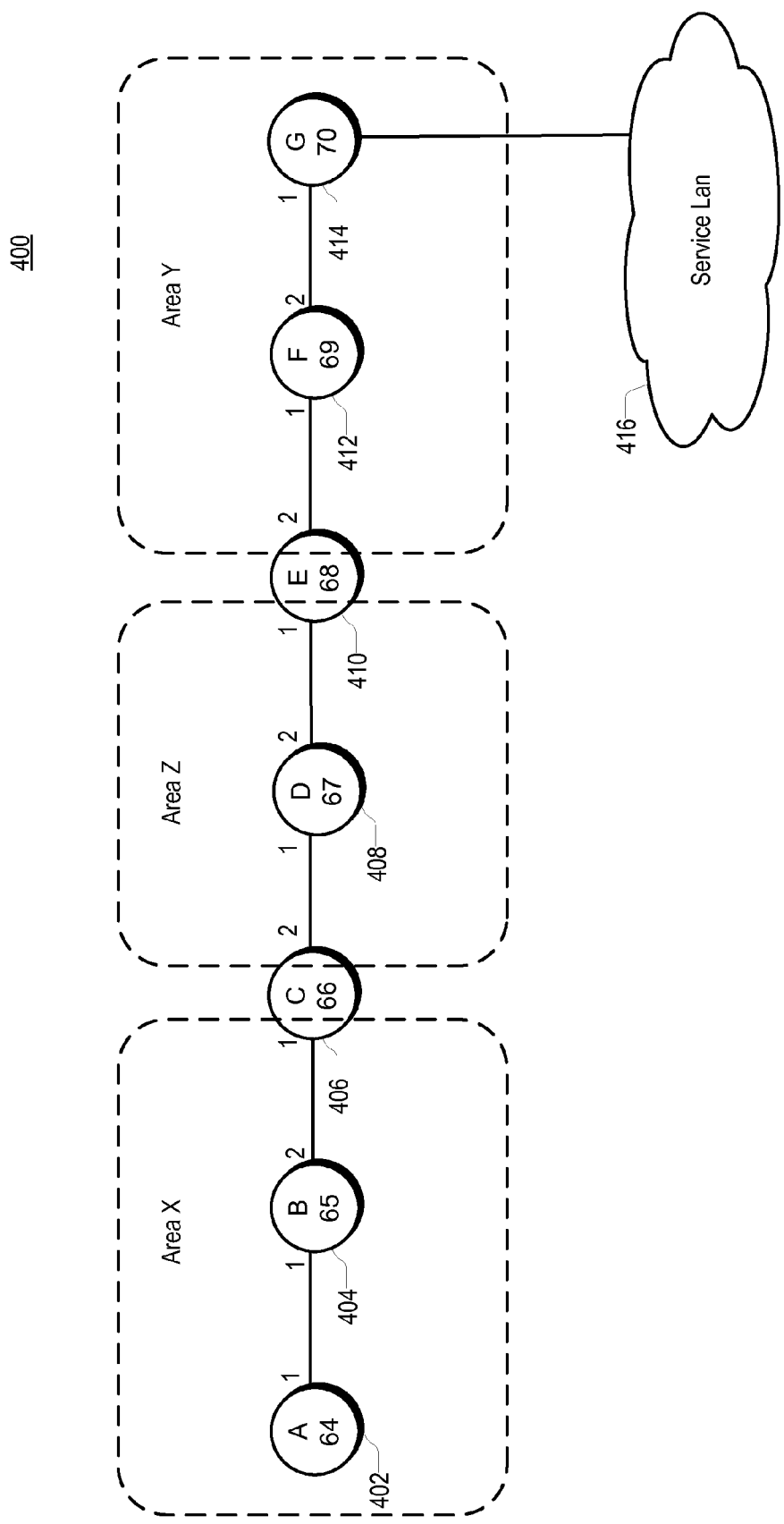
FIG. 4 is a block diagram illustrating an example provider network.

FIG. 4 shows a network diagram of network 400. The network shown in FIG. 4 is configured such that forwarding information is propagated between areas. This enables a first node in a given area to resolve an identity associated with a second node which has advertised a service address, even when the second node is located in a different area than the first node. In one embodiment, the first node is also enabled to determine a nodal segment ID associated with the second node.

Network 400 is a network domain, an autonomous system, a customer network, or the like. Network 400 includes, as shown, three areas. Area X includes node A 402, node B 404, and node C 406. Area Z includes node D 408. Area Y includes node E 410, node F 412, and node G 414. While nodes C 406 and E 410 are shown as being included in two areas, nodes C and E may in fact be included in one area. Nodes C and E represent routers, or nodes, that are configured to transmit packets, such as link state packets or link state advertisements, as well as data packets, between areas. In ISIS terminology, nodes C and E are level 2 or, L1/L2 nodes. In ISIS terminology, nodes C and E would be included in a single area. For example, node C would be included in Area X and node E would be included in Area Y. In this example, node D 408 in Area Z is also an L2 or an L1/L2 node. In OSPF terminology, nodes C 406 and E 410 are area border routers (ABRs). In OSPF, ABRs are considered to be included in both areas for which they form the boundary. That is, node C 406 is included in both Area X and Area Z, and node E 410 is included in both Area Z and Area Y.

Also shown in FIG. 4 is a service LAN 416. Service LAN 416 is coupled to node G 414. Service LAN 416 represents one or more services that are available via node G. Service LAN 416 can include tens, hundreds, thousands, or more services. The services available in service LAN 416 are known as service leafs.

As shown, each of nodes A through G has an associated unique segment identifier that identifies a segment rooted, such as a nodal segment, associated with the node. Each of nodes A through G, in one embodiment, also has an associated IP loopback address. Each of the services in service LAN 416 also has an associated IP address.

As an example, consider node G. In one embodiment, node G is assigned an IP address of 1.1.1.1/32. Node G is also assigned a nodal SID of 70. These identifiers can be assigned by an administrator or automatically, for example, when node G comes online, or joins network 400. Service LAN 416 has IP address 2.0.0/24 assigned. Nodes within area Y know that packets sent to 2.0.0/24 can be forwarded to nodal SID 70, since that will get the packets to node G and 2.0.0/24 is available on node G. However, nodes outside area Y, e.g., nodes in area X, may be unaware that sending packets to node G will cause the packets to reach the service leaf 2.0.0/24.

Node G generates and forwards an advertisement (e.g., a LSP) having IP address 1.1.1.1/32 and nodal SID 70. Node G also generates and forwards an advertisement having IP address 2.0.0/24, but without a nodal SID. Typically, nodal SIDs are assigned to only one IP address, so while node G can advertise 2.0.0/24 with nodal segment 70, since nodal SID 70 is already associated with 1.1.1.1/32, doing so would violate convention with regard to SR. In response to receiving node G's advertisement of 1.1.1.1/32 with nodal SID 70, node E propagates the advertisement across levels (e.g., area boundaries). Node C, in response to receiving the advertisement of 1.1.1.1/32 and nodal SID 70, distributes the advertisement to the nodes in area X. The nodes in area X update their forwarding tables. Subsequently, packets addressed to 1.1.1.1/32 can be forwarded from nodes in area X using nodal SID 70.

Node E, in response to receiving node G's advertisement of 2.0.0/24 (without an associated nodal SID) determines that G is the originating node for 2.0.0/24. Node E adds information identifying node G to the advertisement and then propagates the advertisement across levels. In one embodiment, node E adds an IP address for node G (e.g., 1.1.1.1/32) to a new sub-TLV field in the advertisement. This is known as an originator node, since the address identifies the node that originated the service advertisement, e.g., the advertisement of 2.0.0/24. The format of the originator node address can be, for example, an IPv4 address, an IPv6 address, or a nodal SID. Node C, in response to receiving the advertisement of 2.0.0/24 and 1.1.1.1/32, distributes the advertisement to the nodes in area X. The nodes in area X update their forwarding tables. Subsequently, packets addressed to 2.0.0/24 can be addressed to 1.1.1.1/32. As discussed above, packets addressed to 1.1.1.1/32 can be forwarded from nodes in area X using nodal SID 70.

Figure 5:
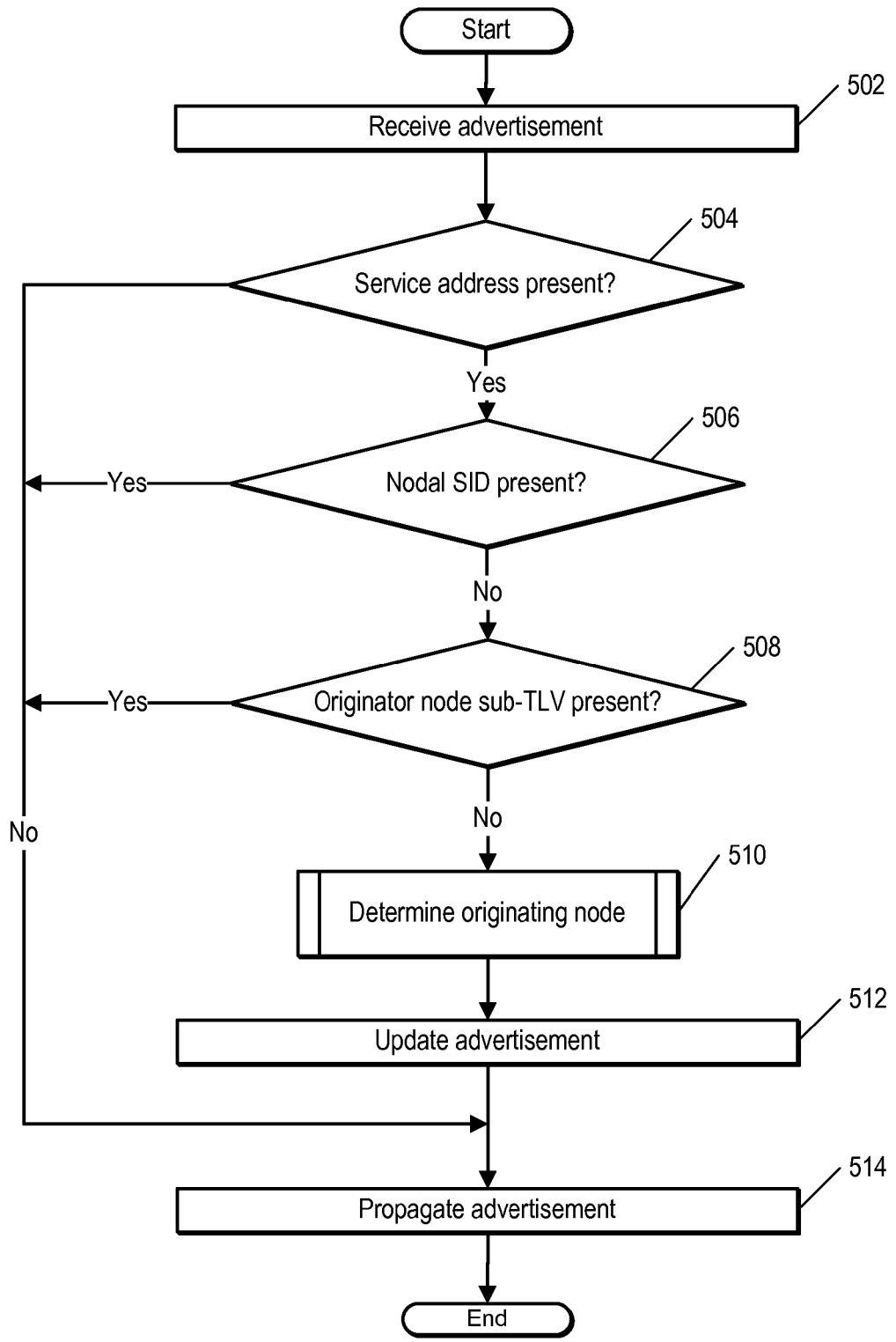
FIG. 5 is a flow chart illustrating an example process employed by a node.

FIG. 5 is a flow chart illustrating an example process employed by a node, such as node E 410 of FIG. 4. In one embodiment, the node that performs FIG. 5 is an area border router or a level 2 capable node. At 502, the node receives an advertisement. In one embodiment, the node receives an advertisement from another node in the area to which the node belongs, such as area Y of FIG. 4. Interior gateway protocols provide for a number of types of advertisements. Each type of advertisement can carry a number of different types of information.

At 504, the node determines whether the advertisement includes a service address. For example, the node can compare an address from the advertisement with a range of addresses known by the node to represent services. In another embodiment, the node can compare the address with values in a forwarding table, where the values are associated with services. If the node determines that the address is not a service address, the node propagates the advertisement at 514. In one embodiment, this involves forwarding the advertisement to one or more other level 2 capable nodes or ABRs.

If the node determines at 504 that the address in the advertisement is a service address, at 506, the node determines whether a nodal segment identifier is present in the advertisement. If so, the service address has already been resolved to a nodal segment and the node propagates the advertisement. If no nodal segment identifier is present in the advertisement, the node determines, at 508, whether the advertisement includes a value identifying an originator node. In one embodiment, as it relates to ISIS, the node examines a sub-TLV field to determine whether information identifying an originator node, such as an address associated with a node via which the service is available, is present. In one embodiment, for example in an OSPF context, the node determines whether the advertisement includes an opaque LSA field including information identifying an originator node associated with the service.

Figure 6:
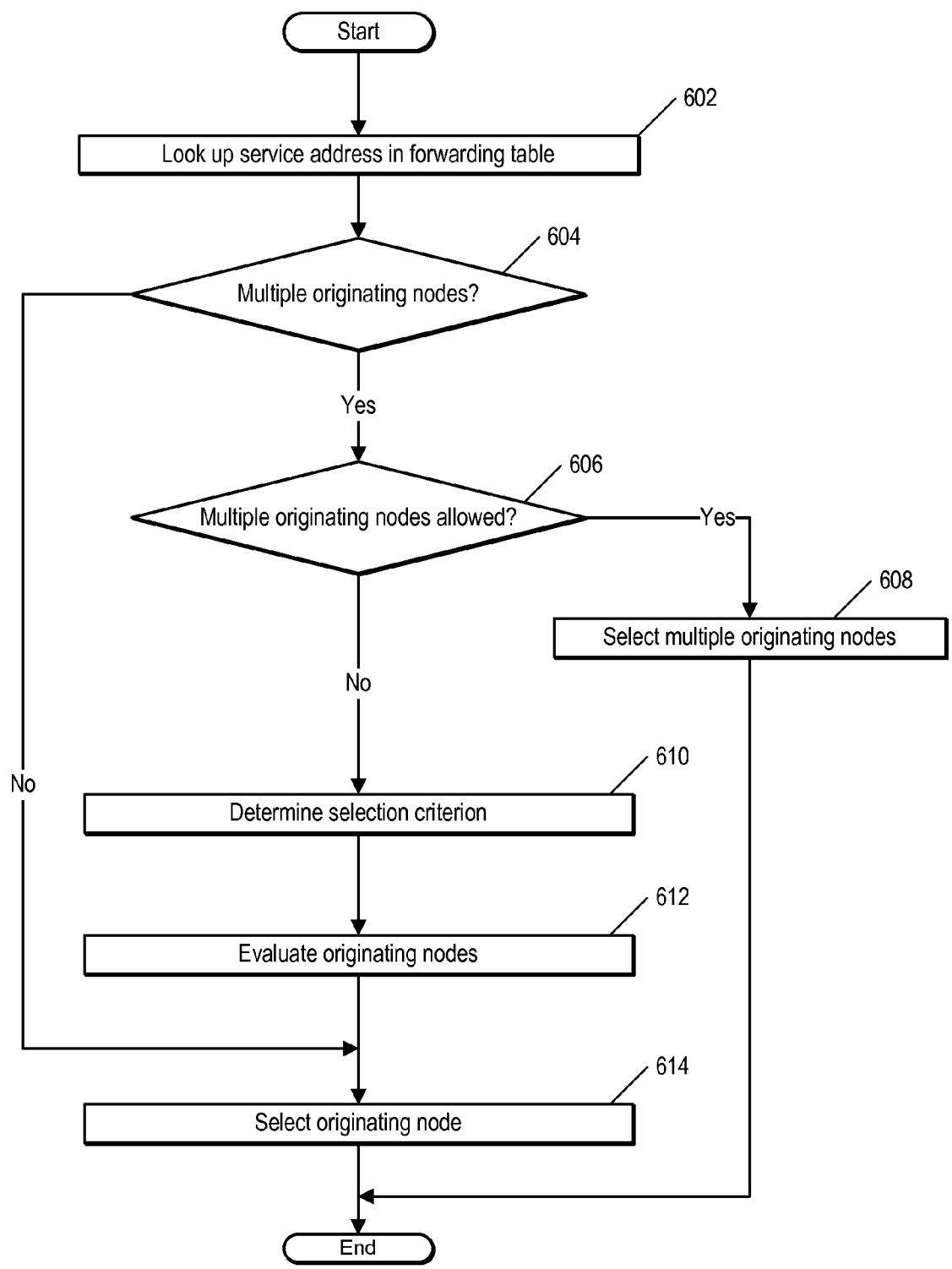
FIG. 6 is a flow chart illustrating an example process employed by a node.

If the node determines that the advertisement does not include information identifying an originator node associated with the service, the node determines an originating node at 510, as discussed in greater detail with regard to FIG. 6. After having determined the originating node, the node updates the advertisement, at 512. In one embodiment, this involves modifying a sub-TLV field, or an opaque link state advertisement field, to include an address associated with the originator node. That is, the node inserts an address, such as an IP address, into the advertisement. At 514, the node propagates the advertisement across an area boundary, or into a new level.

FIG. 6 can be performed by a node, such as node E 410 of FIG. 4, in response to determining that an advertisement of a service address does not include information identifying an originating node. At 602, the node looks up a service address (e.g., the service address included in the advertisement) in a forwarding table. In one embodiment, this involves identifying one or more nodes listed as being capable of providing this service.

At 604, the node determines whether multiple originating nodes were found in the look up. If only a single originating node was found, the node selects the originating node at 614. Otherwise, if multiple originating nodes were detected, at 606, the node determines whether the node is allowed to include multiple originating nodes in the advertisement. For example, the node may be configured to insert multiple addresses into an advertisement, e.g., into a sub-TLV configured to carry information identifying originating nodes. In one embodiment, this determination involves checking a configuration setting, e.g., as specified by an administrator. If multiple originating nodes are allowed, at 608, the node selects the multiple originating nodes.

If multiple originating nodes are not allowed, the node will select one of multiple of possible originating nodes. At 610, the node determines the selection criterion. For example, an administrator can specify that if multiple originating nodes are available, the closest originating node to the ABR (or level 2 capable node) should be used. Another example of a selection criterion is a priority field. For example, nodes with higher priority should be included before nodes with lower priority. Other examples of selection criteria include, for example, quality of service parameters, security constraints, processing capacity, bandwidth, and the like. An algorithm can be specified, e.g., by the administrator, for using the selection criteria either singly or in combination to determine which of a plurality of originating nodes should be selected. Based on the algorithm and the selection criteria, the node evaluates the originating nodes at 612. A result of the evaluation includes one originating node, which is selected by the node at 614.

Figure 7:
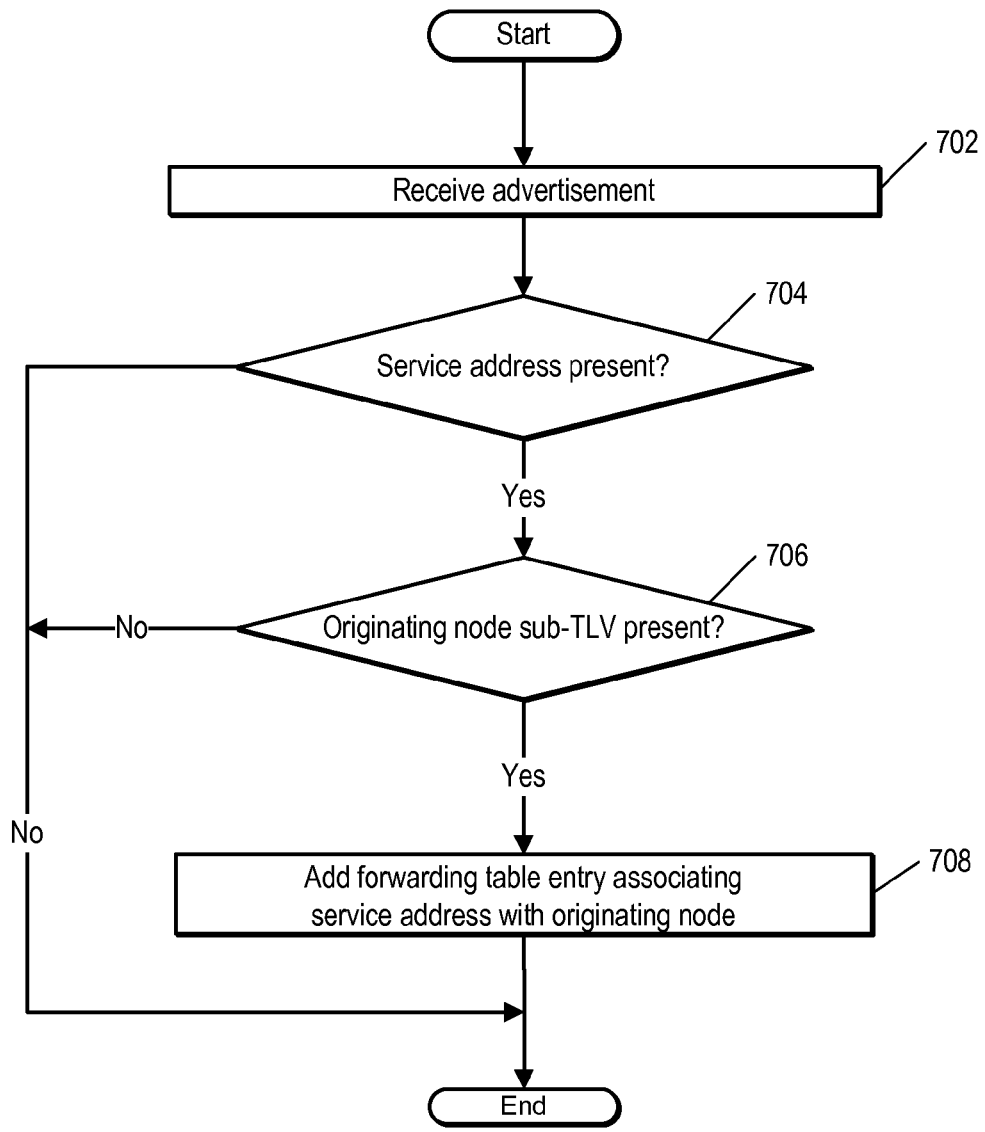
FIG. 7 is a flow chart illustrating an example process employed by a node.

FIG. 7 can be performed by a node, for example node A 402 of FIG. 4. FIG. 7 is performed in response to the node receiving an advertisement, at 702. In one embodiment, the advertisement is received from a node which is in an area other than the area of the node which receives the advertisement. At 704, the node determines whether a service address is present. In one embodiment, this involves the node comparing the address from the advertisement with a range of values known by the node to be associated with services. If the node determines, at 704, that a service address is present, the node determines, at 706, whether the advertisement includes information identifying an originating node. In one embodiment, this involves the node examining a sub-TLV field in the advertisement to determine if the sub-TLV field includes information identifying originating node, such as an IP address associated with an originating node, or a nodal segment identifier associated with the originating node.

If the node determines that the advertisement includes information identifying an originating node, either in a sub-TLV field or in an opaque LSA, the node adds a forwarding table entry, at 708, to the node's forwarding table associating the service address with the information identifying the originating node.

Figure 8:
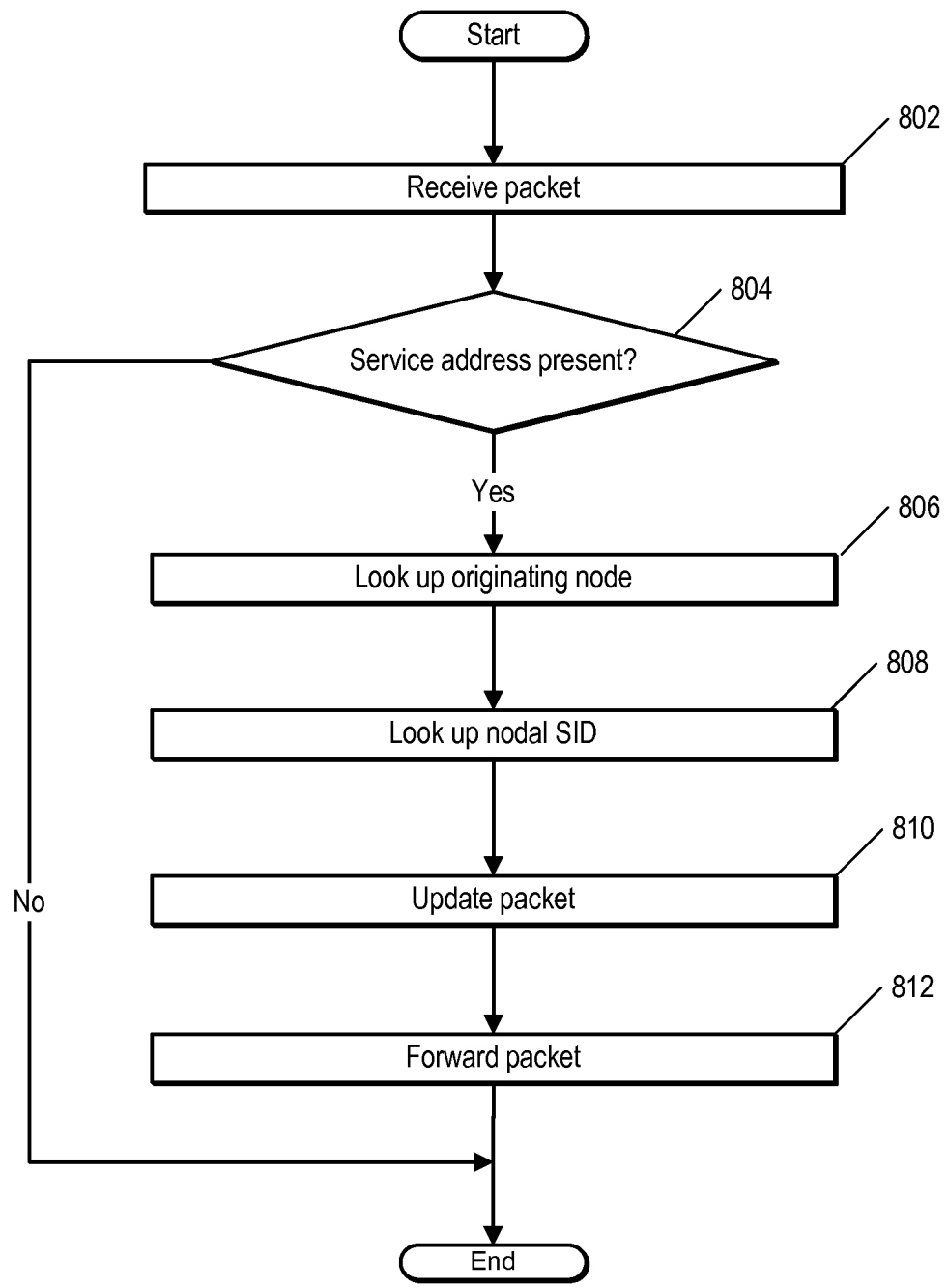
FIG. 8 is a flow chart illustrating an example process employed by a node.

FIG. 8 can be performed by a node such as node C 406 of FIG. 4. In one embodiment, FIG. 8 is performed by an area boundary router or a level 2 capable node. At 802, the node receives a packet. In one embodiment, the packet is received from a node in the same area as the area in which the node is included, such as node A 402 in area X, as shown in FIG. 4. At 804, the node determines whether a service address is present in the packet. In one embodiment, this involves inspecting a destination address field of the packet. In one embodiment, this also involves comparing the destination address with a range of addresses known to be associated with services.

At 806, the node looks up an originating node associated with the service address. In one embodiment, this involves accessing a forwarding table and determining an IP address associated with the service address. At 808, the node looks up a nodal segment identifier associated with the IP address the node has looked up. In one embodiment, this involves the node accessing a forwarding table and determining a nodal segment identifier associated with the IP address of the originating node. At 810, the node updates the packet. In one embodiment, this involves updating a packet header to include the nodal segment identifier. At 812, the node forwards the packet along the nodal segment identified by the nodal segment identifier.

Example Node

Figure 9:
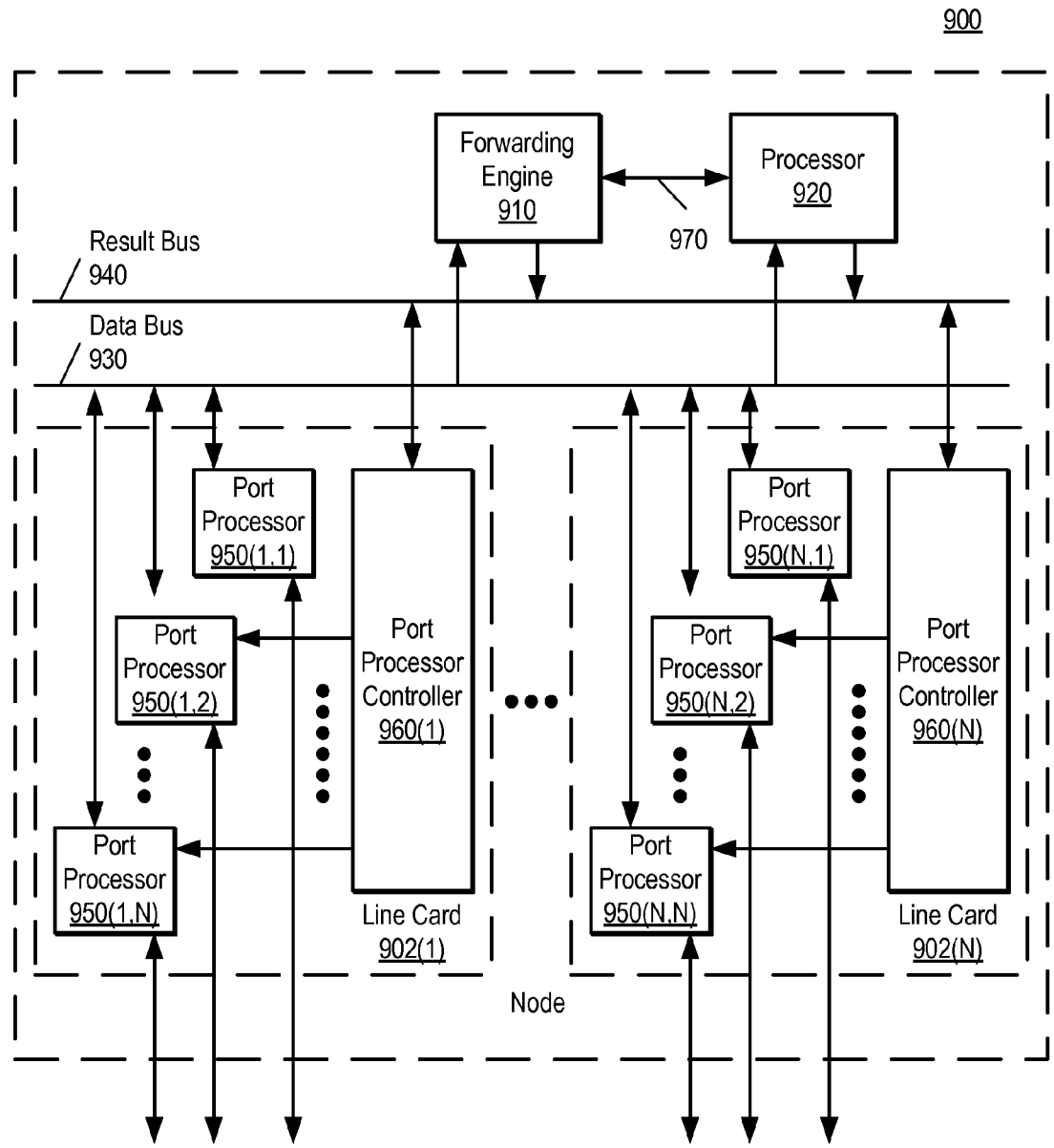
FIG. 9 is a block diagram illustrating certain components of an example node that can be employed in the networks of FIG. 4.

FIG. 9 is a block diagram illustrating certain additional and/or alternative components of nodes that can be employed in the network shown in FIG. 4. In this depiction, node 900 includes a number of line cards (line cards 902(1)-(N)) that are communicatively coupled to a forwarding engine or packet forwarder 910 and a processor 920 via a data bus 930 and a result bus 940. Line cards 902(1)-(N) include a number of port processors 950(1,1)-(N,N) which are controlled by port processor controllers 960(1)-(N). It will also be noted that forwarding engine 910 and processor 920 are not only coupled to one another via data bus 930 and result bus 940, but are also communicatively coupled to one another by a communications link 970.

The processors 950 and 960 of each line card 902 may be mounted on a single printed circuit board. When a packet or packet and header are received, the packet or packet and header may be identified and analyzed by router 900 in the following manner. Upon receipt, a packet (or some or all of its control information) or packet and header is sent from the one of port processors 950(1,1)-(N,N) at which the packet or packet and header was received to one or more of those devices coupled to data bus 930 (e.g., others of port processors 950(1,1)-(N,N), forwarding engine 910 and/or processor 920). Handling of the packet or packet and header can be determined, for example, by forwarding engine 910. For example, forwarding engine 910 may determine that the packet or packet and header should be forwarded to one or more of port processors 950(1,1)-(N,N). This can be accomplished by indicating to corresponding one(s) of port processor controllers 960(1)-(N) that the copy of the packet or packet and header held in the given one(s) of port processors 950(1,1)-(N,N) should be forwarded to the appropriate one of port processors 950(1,1)-(N,N). In addition, or alternatively, once a packet or packet and header has been identified for processing, forwarding engine 910, processor 920 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a node receiving such a processed packet or packet and header, the corresponding process is performed to recover or validate the packet's or packet and header's information that has been thusly protected.

Node 900 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to node 900 for storage in memory via a network such as the Internet or upon a carrier medium.

The computer-readable medium containing the computer program may be loaded into node 900. All or a portion of the computer program stored on the computer-readable medium may then be stored in system memory and/or various portions of storage devices coupled to node 900 (not shown). When executed by processor 920, a computer program loaded into node 900 may cause processor 920 to perform and/or be a means for performing the functions of one or more of the embodiments described and/or illustrated herein. Additionally or alternatively, one or more of the embodiments described and/or illustrated herein may be implemented in firmware and/or hardware.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving an advertisement, wherein
      the advertisement comprises a service address associated with a service;
   identifying an originator node for the service from a plurality of nodes in an area of a plurality of areas of a network,
      wherein
      each of the plurality of areas comprises a respective set of nodes, and
      the originator node is associated with a nodal segment identifier; and
   updating the advertisement, wherein
      the updating the advertisement comprises adding information identifying the originator node to the advertisement.

2. The method of claim 1, wherein
   the information comprises an IP address.

3. The method of claim 1, wherein
   the information comprises the nodal segment identifier.

4. The method of claim 1, further comprising:
   determining a set of nodes that are each originator nodes for the service; and
   selecting the originator node from the set of nodes based on a selection criterion.

5. The method of claim 1, wherein
   the updating the advertisement comprises modifying a sub-TLV value.

6. The method of claim 1, wherein
   the updating the advertisement comprises modifying an opaque link state advertisement.

7. The method of claim 1, wherein
the identifying the node comprises performing a lookup in a forwarding table.

8. The method of claim 1, further comprising:
propagating the advertisement from a first area to a second area.

9. A system comprising:
a first node comprising a processor and forwarding engine, wherein the node is
configured to
receive an advertisement, wherein
the advertisement comprises a service address associated with a service;
identify an originator node for the service from a plurality of nodes in an area of a plurality of areas of a network,
wherein
each of the plurality of areas comprises a respective set of nodes, and
the originator node is associated with a nodal segment identifier; and
update the advertisement, wherein
updating the advertisement comprises adding information identifying the originator node to the advertisement.

10. The system of claim 9, wherein
the information comprises an IP address.

11. The system of claim 9, wherein
the information comprises the nodal segment identifier.

12. The system of claim 9, wherein the first node is further configured to:
determine a set of nodes that are each originator nodes for the service; and
select the originator node from the set of nodes based on a selection criterion.

13. The system of claim 9, wherein
updating the advertisement comprises modifying a sub-TLV value.

14. The system of claim 9, wherein
updating the advertisement comprises modifying an opaque link state advertisement.

15. A non-transitory computer readable medium comprising executable instructions, wherein a method is implemented in response to executing the instructions, the method comprising:
receiving an advertisement, wherein
the advertisement comprises a service address associated with a service;
identifying an originator node for the service from a plurality of nodes in an area of a plurality of areas of a network,
wherein
each of the plurality of areas comprises a respective set of nodes, and
the originator node is associated with a nodal segment identifier; and
updating the advertisement, wherein
the updating the advertisement comprises adding information identifying the originator node to the advertisement.

16. The non-transitory computer readable medium of claim 15, wherein the method further comprises:
the information comprises an IP address.

17. The non-transitory computer readable medium of claim 15, wherein the information comprises the nodal segment identifier.

18. The non-transitory computer readable medium of claim 15, wherein the method further comprises:
determining a set of nodes that are each originator nodes for the service; and
selecting the originator node from the set of nodes based on a selection criterion.

19. The non-transitory computer readable medium of claim 15, wherein
the updating the advertisement comprises modifying a sub-TLV value.

20. The non-transitory computer readable medium of claim 15, wherein
the updating the advertisement comprises modifying an opaque link state advertisement.

* * * * *